No. 792,683.

Patented June 20, 1905.

UNITED STATES PATENT OFFICE.

FRIEDRICH SAMUEL VALENTINER, OF LEIPSIC, GERMANY, ASSIGNOR TO COMPAGNIE "MORANA" SOCIÉTÉ ANONYME, OF ZURICH, SWITZERLAND.

PROCESS OF MAKING SULFURETED HYDROCARBONS.

SPECIFICATION forming part of Letters Patent No. 792,683, dated June 20, 1905.

Application filed October 12, 1903. Serial No. 176,763.

*To all whom it may concern:*

Be it known that I, FRIEDRICH SAMUEL VALENTINER, a subject of the King of Saxony, and a resident of Leipsic, Saxony, Germany, have invented a certain new and useful Process of Making Sulfureted Hydrocarbons, of which the following is a description.

This present invention has reference to the production of sulfureted hydrocarbons.

It has been found that aldehydes may be condensed with sulfureted hydrocarbons of the principle formula $\begin{array}{c}R\\R\end{array}\!\!>\!\!C=S$. In this formula R may be substituted by any organic radical. The condensation takes place in that the oxygen and hydrogen of the $C\!\!<\!\!{}^H_O$ with the one hydrogen of the sulfureted hydrocarbon is separated in the form of water, at the same time forming a high molecular sulfureted hydrocarbon. To show the validity of this reaction, I have condensed several aldehydes—for example, an aliphatic, an aromatic, and an olefinic terpenaldehyde—with sulfureted hydrocarbons. By analysis I have found that this reaction always took place in accordance with said formula.

For better understanding I give hereinafter some details of the aforesaid examples:

*First. Aliphatic aldehyde.*—Formaldehyde is condensed with the theoretical quantity of thioacetone in the presence of suitable means for condensation—as, for instance, diluted caustic soda. The product thus obtained consists of an amorphous colorless body which is insoluble in water, ether, ligroin, slightly soluble in alcohol, benzene, or chloroform, but is easily dissolved in epichlorhydrin. The melting-point is not sharp, and the said product constitutes a ductile, tenacious, and kneadable mass having the formula $C_4H_6S$.

Analysis: Sulfur, theoretically found, 37.21 per cent.; practically found, 37.28 per cent.

*Second. Aromatic aldehyde.*—If the formaldehyde is replaced by benzaldehyde, a body of a very light yellow color is obtained which crystallizes from alcohol in colorless fine needles of crystals, being fusible at 175° to 176° centigrade. The formula of this new body is $C_{10}H_{10}S$.

Analysis: Sulfur, theoretically found, 19.75 per cent.; practically found, 19.59 per cent.

*Third. Olefinic terpenaldehyde.*—By using olefinic terpenaldehyde citral instead of formaldehyde an oil of yellow color with a light smell of leek of the formula $C_{13}H_{20}S$ is obtained, which boils at 150° to 153° centigrade under a pressure of twelve millimeters.

Analysis.

|   | Theoretically found. | Practically found. |
|---|---|---|
|   | Per cent. | Per cent. |
| C | 75.00 | 75.08 |
| H | 9.62 | 9.83 |
| S | 15.38 | 15.11 |
|   | 100.00 | 100.02 |

The same products as above described are obtained by using a solution of metallic sulfids, polysulfids, and sulfhydrates or sulfids of ammonium for the condensation of aldehydes with acetones. In this reaction the oxygen of CO is replaced by sulfur and at the same time condensation takes place at $C\!\!<\!\!{}^H_O$ of the aldehyde, simultaneously forming water.

On account of the great amount of sulfur which they contain the substances produced by the hereinbefore-described process are used in pharmaceutical chemistry for inner and outer application, as also in connection with cosmetic perfumery.

What I claim is—

1. The method of producing sulfureted hydrocarbons by condensing aldehydes with sulfureted hydrocarbons of the general formula $\mathrm{\begin{matrix}R\\R\end{matrix}\!\!>\!\!C\!-\!S}$ in the presence of a condensing agent, substantially as described.

2. The method of producing sulfureted hydrocarbons by condensing aldehydes with acetones in the presence of metallic sulfids, substantially as described In witness whereof I have hereunto set my hand in presence of two witnesses.

FRIEDRICH SAMUEL VALENTINER.

Witnesses:
  HERM. LARK,
  RUDOLPH FRICKE.